United States Patent
Venon

(10) Patent No.: US 8,907,914 B2
(45) Date of Patent: Dec. 9, 2014

(54) METHODS AND APPARATUS FOR DOCUMENTING A PROCEDURE

(75) Inventor: Medhi Venon, Whitefish Bay, WI (US)

(73) Assignee: General Electric Company, Schenectady, NY (US)

(*) Notice: Subject to any disclaimer, the term of this patent is extended or adjusted under 35 U.S.C. 154(b) by 223 days.

(21) Appl. No.: 13/601,790

(22) Filed: Aug. 31, 2012

(65) Prior Publication Data

US 2014/0062851 A1 Mar. 6, 2014

(51) Int. Cl.
*G06F 3/041* (2006.01)
*G06F 3/03* (2006.01)

(52) U.S. Cl.
CPC .................................. *G06F 3/0304* (2013.01)
USPC .......................................... 345/173; 345/156

(58) Field of Classification Search
CPC ...... G06F 3/03; G06F 3/0304; G06F 3/03488; G06F 3/03547; G06F 2203/04808
USPC ................... 345/156, 173; 178/18.01, 18.09; 340/573.1; 715/863
See application file for complete search history.

(56) References Cited

U.S. PATENT DOCUMENTS

| | | | |
|---|---|---|---|
| 7,697,729 B2* | 4/2010 | Howell et al. | 382/115 |
| 8,432,367 B2* | 4/2013 | Li et al. | 345/173 |
| 8,446,367 B2* | 5/2013 | Benko et al. | 345/166 |
| 2006/0103633 A1* | 5/2006 | Gioeli | 345/173 |
| 2008/0104547 A1 | 5/2008 | Morita et al. | |
| 2008/0114615 A1 | 5/2008 | Mahesh et al. | |
| 2009/0167723 A1* | 7/2009 | Kwong et al. | 345/175 |
| 2010/0131294 A1* | 5/2010 | Venon et al. | 705/3 |
| 2010/0304731 A1* | 12/2010 | Bratton et al. | 455/420 |
| 2011/0019058 A1* | 1/2011 | Sakai et al. | 348/333.01 |
| 2011/0050630 A1* | 3/2011 | Ikeda | 345/174 |
| 2011/0141047 A1* | 6/2011 | Iwaizumi et al. | 345/173 |
| 2011/0206361 A1* | 8/2011 | Iwamoto | 396/263 |
| 2011/0298732 A1* | 12/2011 | Yoshimoto et al. | 345/173 |
| 2012/0014684 A1* | 1/2012 | D'Souza et al. | 396/263 |
| 2012/0056814 A1* | 3/2012 | Sudo | 345/168 |
| 2012/0113056 A1* | 5/2012 | Koizumi | 345/175 |
| 2012/0139950 A1* | 6/2012 | Sogo | 345/661 |
| 2012/0194561 A1* | 8/2012 | Grossinger et al. | 345/661 |
| 2013/0013331 A1* | 1/2013 | Horseman | 705/2 |
| 2013/0050069 A1* | 2/2013 | Ota | 345/156 |
| 2013/0198682 A1* | 8/2013 | Matas et al. | 715/784 |
| 2014/0028572 A1* | 1/2014 | St. Clair | 345/173 |

OTHER PUBLICATIONS

Kazuhiro Terajima et al., "Fast Finger Tracking System for In-air Typing Interface", CHI 2009—Spotlight on Works in Progress—Session 1, Apr. 4-9, 2009, 6 pages, Boston, MA, U.S.A.

(Continued)

*Primary Examiner* — Joe H Cheng
(74) *Attorney, Agent, or Firm* — Hanley, Flight and Zimmerman, LLC

(57) ABSTRACT

Methods and apparatus are disclosed for documenting a procedure in a touchless environment. Example methods disclosed herein include identifying a position of one or more of a user's fingertips using a camera of a mobile device and an entropy-based segmentation of an image input, determining a correspondence between user fingertip position and a control interface of the mobile device, including a plurality of functions to be executed based on user input, triggering the mobile device to execute one or more of the plurality of functions based on the user fingertip position during a procedure, and documenting one or more events of the procedure based on the user input for generating a report to be stored in a storage device of the mobile device.

20 Claims, 8 Drawing Sheets

(56) References Cited

OTHER PUBLICATIONS

Daniel R. Schlegel et al., "AirTouch: Interacting With Computer Systems At a Distance", IEEE, 2010, 8 pages.

Anne-Marie Burns et al., "Finger Tracking Methods Using EyesWeb", 12 pages.

Solutions News Partners Developers Contact Above by PrimeSense, www.primesense.com/?p=563, retrieved Nov. 30, 2012, 1 page.

PACS World, retrieved Nov. 27, 2012, pacsworld.blogspot.com/2010/11/microsoft-kinect-and-pacs.html, "Microsoft Kinect and PACS?", Nov. 10, 2010, 4 pages.

My Medical Records, retrieved Nov. 27, 2012, ducknetweb.blogspot.com/2010/12/microsfot-kinect-working-with-pacs.html, "Microsoft Kinect Working with a PACS Server-Images on Steroids Via Gestures (Video)", Dec. 21, 2010, 12 pages.

* cited by examiner

METHODS AND APPARATUS FOR DOCUMENTING A PROCEDURE

FIELD OF THE DISCLOSURE

This disclosure relates generally to interacting with a mobile device, and, more particularly, to documenting procedures using a mobile device.

BACKGROUND

Mobile devices, such as tablet computers, personal computers (PC), smartphones, mp3 players, etc., have developed many uses. These devices typically include a touchscreen and/or keyboard for user control of the device as well as a camera for taking pictures and/or videos.

In some environments, using a touchscreen or keyboard to control the device is not practical. For example, an operating room of a healthcare facility must remain a sterile environment, and therefore, the use of a touchscreen and/or keyboard is very cumbersome and limited to the risk of infection, contamination by touching the screen. Accordingly, a sterile environment does not allow for several users (e.g. nurses, surgeons, anesthesiologist, etc.) to operate such a device in that particular environment.

BRIEF SUMMARY

An example method disclosed herein includes identifying a position of a user's fingertips in a virtual plane formed apart from a control interface of a mobile device using a camera of the mobile device and an entropy-based segmentation of an image input from the camera, determining a correspondence between user fingertip position and the control interface of the mobile device, the correspondence forming a user input, the control interface including a plurality of functions to be executed based on the user input, facilitating execution, via the mobile device, of one or more of the plurality of functions based on the user fingertip position in the virtual plane during a procedure, and documenting one or more events of the procedure based on the user input to generate a report to be output via the mobile device.

An example apparatus disclosed herein includes an image filter to identify a position of one or more of fingertips in a virtual plane formed apart from a control interface of a mobile device using a camera of the mobile device and an entropy-based segmentation of an image input from the camera, a user command identifier to determine a correspondence between user fingertip position and the control interface of the mobile device, the correspondence forming a user input, the control interface including a plurality of functions to be executed based on the user input, a controller to facilitate execution, via the mobile device, of one or more of the plurality of functions based on the user fingertip position in the virtual plane during a procedure, and a documenter to document one or more events of the procedure based on the user input to generate a report to be output via the mobile device.

An example machine medium comprising instructions which when executed cause a machine to identify a position of one or more of a user's fingertips in a virtual plane formed apart from a control interface of a mobile device using a camera of the mobile device and an entropy-based segmentation of an image input from the camera, determine a correspondence between user fingertip position and the control interface of the mobile device, the correspondence forming a user input, the control interface including a plurality of functions to be executed based on the user input, facilitate execution, via the mobile device, of one or more of the plurality of functions based on the user fingertip position in the virtual plane during a procedure, and document one or more events of the procedure based on the user input to generate a report to be output via the mobile device.

DETAILED DESCRIPTION

Figure 1:
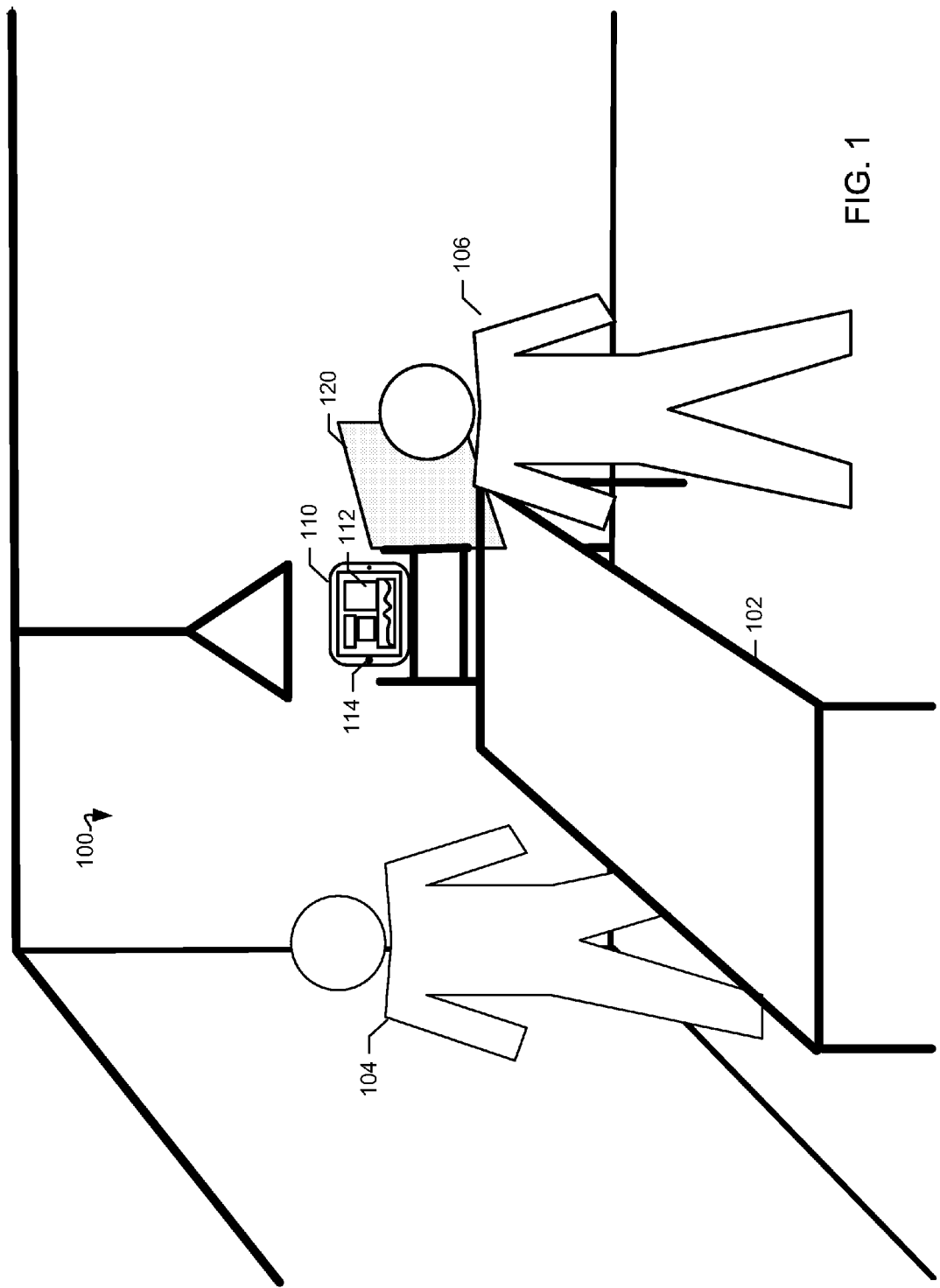
FIG. 1 illustrates an example environment of use for a touchless method of interacting with a mobile device in accordance with the teachings of this disclosure.

Certain examples provide real time (or substantially real time accounting for processing and/or storage delay) input from an ongoing procedure for documentation of procedure events occurring in an environment in which control of a mobile device using a touchscreen and/or keyboard is not practical. Accordingly, allowing users in an environment to control a single device to avoid repeating documentation and allow for increased accuracy and efficiency is provided in this disclosure.

Additionally, in many environments, in particular an operating room of a healthcare facility, it may be difficult or impossible for a user to control a mobile device to document a procedure (e.g., tablet computer, smartphone, personal digital assistant, laptop computer etc.) using the standard control interface (touchscreen, keyboard, mouse, etc.) of the mobile device. Various reasons for the inability to control the mobile device using the standard control interface may include keeping the user's hands sterile and/or keeping device clean from debris (e.g., blood, dirt, oil, etc.). Accordingly, having the ability to control the mobile device to document the procedure without touching the mobile device would be desirable.

Example methods and apparatus disclosed allow a user to control the mobile device to document a procedure without touching the mobile device using the camera of the mobile device and an entropy-based segmentation of images captured by the camera. The camera captures images of the user's hands, and the entropy-based segmentation applied to the images is used to identify the user's fingertip location. The use of entropy-based segmentation allows for any hand, whether it is from the same user or several users, to be identified even if it is covered in debris or soiled. A virtual plane may be established for identification of the one or more user's fingertips. The virtual plane can be used as an "in air" control interface corresponding to the control interface (e.g., touchscreen, display, etc.) of the mobile device. The user may then control the mobile device using the virtual plane as the control interface, and accordingly, the user can then access some or all functions (e.g., browsers, applications, etc.) of the mobile device.

Additionally, it may be desirable to document the instruments or devices that a user is using for a certain procedure, without having to indicate the instrument or device using standard control interface. Example methods and apparatus disclosed identify the instruments or devices using the camera of the mobile device. The images received from the camera are monitored by a device detector that detects or may recognize labels, bar codes, and/or shapes of the instruments or devices being used in the procedure. The user may present the device to the camera for identification, and the mobile device documents the use of the device and when it is being used during the procedure.

Example methods and apparatus disclosed enable a mobile device to receive documentation data as described above and compile the data to generate a report of the procedure. The documentation data may be compiled after being converted to an appropriate format. In some examples, the documentation data includes transcribed voice to text data to report any instructions, discussions, and/or user commands made during the procedure. Additionally, the mobile device may record audio, video, and/or images of the procedure and provide the audio capture, video capture, and/or image capture with the generated report.

Thus, the disclosed methods and apparatus allow a user to interact with a mobile device to document a procedure with substantially no need to use the standard control interface of the mobile device.

FIG. 1 illustrates an example environment 100, such as an operating room of a healthcare facility, in which an example mobile device 110 may be used. In the example environment 100, an operating table 102, users 104, 106, a mobile device 110, and a virtual plane 120 are shown. In the environment 100, the users 104, 106 may perform a procedure on operating table 102. In the illustrated example, the mobile device 110 is located within a viewing distance from the users 104, 106. In some examples, the mobile device can be one or more of a tablet computer, cellular phone, smartphone, personal digital assistant (PDA), personal computer (PC), laptop computer, etc. Furthermore, in the illustrated example, the environment 100 is a sterile environment, in which the users 104, 106 should not touch the mobile device 110 so as not to spread any contaminates on the users 104, 106 and/or the mobile device 100. In the illustrated example, the mobile device 110 has a touchscreen 112 and a camera 114.

Users 104, 106 can document the procedure being performed in the illustrated example of FIG. 1 using the mobile device 110 without touching the mobile device 110 during the procedure. In the illustrated example, the camera 114 of the mobile device 110 may be used to detect fingertips of the users 104, 106 using entropy-based segmentation. In some examples, the entropy-based segmentation allows for detection of the users' 104, 106 fingertips even if the users 104, 106 are using gloves and/or if the users' gloves and/or fingertips are covered in debris (e.g. blood, dirt, oils, etc.) or soiled. A virtual plane 120 corresponding to the touchscreen 112 of the mobile device 100 may be established for the users 104, 106 to control the mobile device 110. The users 104, 106 may select icon(s) displayed on the touchscreen 112 designating function(s) to be executed on the mobile device 110 by pointing to a location of the virtual plane 120 corresponding to the location of the icon(s) on the touchscreen 112.

In some examples, the users 104, 106 of FIG. 1 may use devices during a procedure that can be identified by the mobile device 100. In some examples, the mobile device 100 includes a device identifier that uses the camera 114 of the mobile device 100. The device identifier may automatically recognize a device based on one or more types of device identification (e.g. a bar code, label, device shape, etc.). In some examples, the mobile device 100 decodes the device identification to determine device information (e.g. device name, type, model, etc.). In some examples, the mobile device 100 cross-references the device identification with a database stored on the mobile device 100 or at another location accessible by a network connected to the mobile device 100.

In some examples, the mobile device 110 records the procedure performed in the example environment 100 of FIG. 1. A video recording of a procedure may be performed and associated with a report documenting the procedure. The mobile device 110 may enable voice identification software to determine which of the users 104, 106 was speaking at a given time. Furthermore, in some examples, the mobile device 110 may employ a voice to text function to transcribe spoken words of the users 104, 106 for generation of a report of the procedure performed in the example environment 100.

Accordingly, in the example environment 100 of FIG. 1 the users 104, 106 may document a procedure using the example mobile device 110 without having to touch the mobile device. For example, the mobile device 100 may document the procedure by generating a report that includes control commands of mobile device 100 users, identification(s) of device(s) used during the procedure, audio capture, video capture, still image capture of the procedure, voice to text transcription(s) of discussion/instruction of user(s) during the procedure, application function(s) used on the mobile device 100 during the procedure, reference material(s) and/or file(s) accessed by the user(s) during the procedure, etc. Documentation may combine one or more of these content items to form a report, for example.

Figure 2:
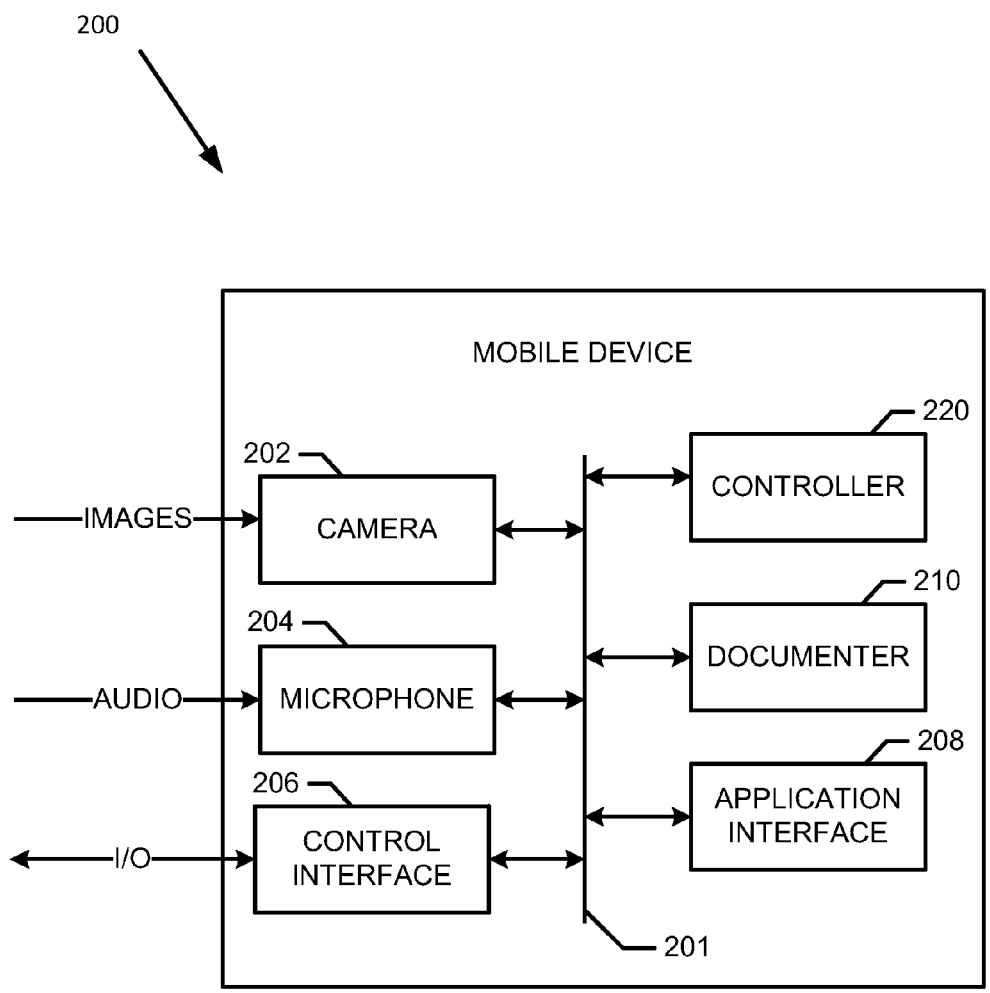
FIG. 2 is a block diagram of an example mobile device constructed in accordance with the teachings of this disclosure.

FIG. 2 is a block diagram of an example mobile device 200 that may be used to implement the mobile device 110 of FIG. 1. The example mobile device 200 includes a camera 202, a microphone 204, a control interface 206, an application interface 208, a documenter 210, and a controller 220. The example mobile device 200 includes a communication bus 201 that facilitates communication between the camera 202, the microphone 204, the control interface 206, the application interface 208, the documenter 210, and/or the controller 220. In the illustrated example, each of the boxes (202-220) may be combined, rearranged etc. For example, the camera 202 may be combined with the microphone 204. In some examples, the camera 202 receives example images and the microphone 204 receives example audio. In some examples, the control interface 206 receives input from a user (e.g. a touchscreen, keypad, etc.) and sends output to the user (e.g. a display, etc.). The application interface 208 may allow user(s), via the control interface 206, and or the controller 220 to interact with and/or execute applications and/or functions that may be stored on the mobile device 200. In some examples, the example documenter 210 may store and/or record user interactions with the mobile device 200. The documenter 210 may generate a report of events based on the user interactions for a procedure being performed by the user.

The example controller 220 may be used to execute the commands of a user (e.g. the users 104, 106) received via the user interface 206. The controller 220 may also receive commands from the users (e.g., the users 104, 106) based on a fingertip positions identified by the camera 202 using an example entropy-based segmentation algorithm. In some examples, the controller 220 receives the images from the camera 202 and applies the entropy-based segmentation algorithm to the images. Having applied the example algorithm, the controller 220 identifies the users 104, 106 fingertip locations in the images. After applying the example algorithm to a series of images received from the camera 202, the example controller can interpret commands from the users 104, 106 based on the fingertip locations. Some commands may include, but are not limited to, controlling functions and/or applications of the mobile device 200, requesting identification of a device, operating a browser of the mobile device 200, operating the camera and/or microphone of the mobile device 200, etc.

Figure 3:
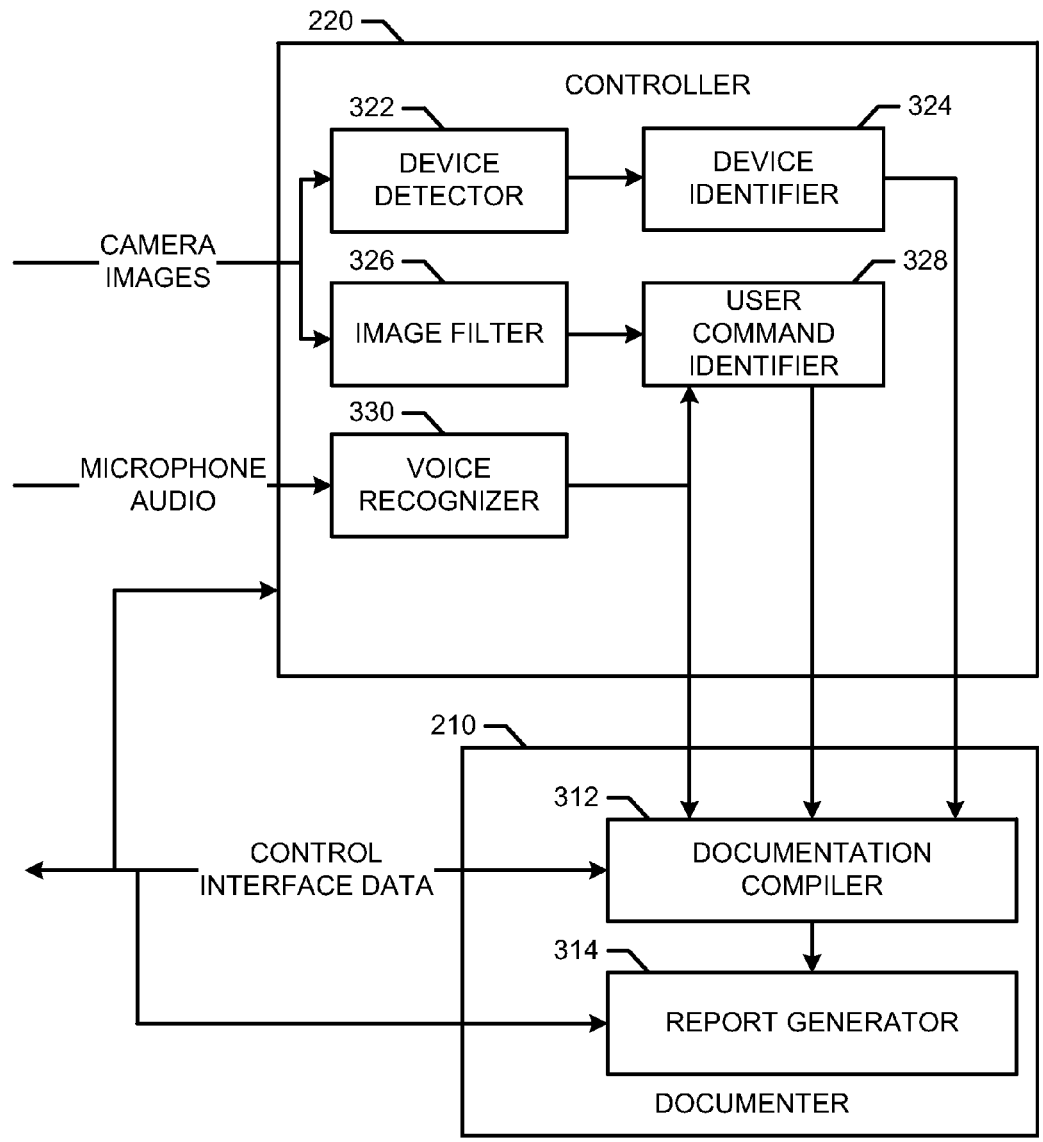
FIG. 3 is a block diagram of an example controller and an example documenter for use in the example mobile device of FIG. 2.

FIG. 3 is a block diagram of an example controller 220 and an example documenter 210 which may be used to implement the controller 220 and documenter 210 of FIG. 2, respectively. In the illustrated example, the example controller 220 of FIG. 3 includes a device detector 322, a device identifier 324, an image filter 326, a user command identifier 328, and a voice recognizer 330. In the illustrated example, the example documenter 210 includes a documentation compiler 312 and a report generator 314.

In FIG. 3, the example controller 220 receives example images from a camera (e.g. the camera 202), audio from a microphone (e.g. the microphone 204), and control interface data from a control interface (e.g. the control interface 206). In the illustrated example, images are received by the device detector 322 and the image filter 326.

The example device detector 322 of FIG. 3 may recognize a unique identifier of a device that is being used during an example procedure. For example, in a medical procedure, devices may include implants installed and/or tools used during the medical procedure. The device detector 322 may automatically recognize a label, barcode, and/or shape of the example devices. Once the device detector 322 recognizes an image of a device identification, the device detector 322 forwards the image to the device identifier 324 to determine device information based on the image. The device identifier 324 may decode the image to obtain the device information. For example, the device identification may include a bar code. The device identifier 324 may use a scanning software/function to determine the device information. In some examples, the device identifier 324 may decode the image to identify text in the image, such as labels and/or model numbers on the device. In some examples, the controller 220 and/or device identifier 324 may then cross reference the image with device information stored in a database of an example mobile device (e.g. the mobile device 200) to identify device information. Once the device identifier 324 determines the device information, the device information forwards the information to documenter 210 (perhaps via a communication bus, such as communication bus 201).

The example image filter 326 of FIG. 3 receives images from the camera (e.g. the camera 202). The image filter 326 focuses on texture based regions of an image for segmentation of the hands, fingers, and/or fingertips with the background. After applying an entropy-based segmentation algorithm to the images, a min-max filter may be applied to identify the fingers. Once the hands, fingers, and/or fingertips of an example user (e.g. the users 104, 106) are identified using the image filter 326 for the images, a user command identifier 328 of FIG. 3 determines a user command from the filtered images.

The user command identifier 328 of FIG. 3 tracks the user's hands, fingers, and/or fingertips in the images based on the segmentation of the images by the image filter 326. By determining the location of the user's hands, fingers, and/or fingertips in each of the images, the user command identifier 328 can interpret the commands of the user by cross-referencing command data stored in a storage device of the example mobile device 200 and/or a database connected to a network in connection with the mobile device. In some examples, the controller 220 uses the commands identified by the user command identifier to execute applications and/or functions of the mobile device 200. The user command identifier 328 may forward the identified commands to the documenter 210 for documentation.

The voice recognizer 330 of FIG. 3 receives audio from a microphone of the example mobile device 200. The voice recognizer 330 may filter the voice data and forward the filtered data to the user command identifier 328 to determine a command from the user. In some examples, the controller 220 may use the voice command data from the voice recognizer 330 to control the example mobile device. In some examples, the voice recognizer 330 converts the voice data to text and forwards the voice data to the documenter 210 for documentation. In certain examples, the voice recognizer 330 has voice recognition software, and may identify one or more users (e.g., the users 104, 106) based on the voice received over the audio. The voice recognizer 330 may associate the voice data to each of the example users and forward the information to the documenter 210. In some examples, the documenter 210 documents the voice data and associates the voice data with each corresponding user to document which user voiced which command and/or information about an example procedure.

The documenter 210 of FIG. 3 receives data from the controller 220 via the device identifier 324, the user command identifier 328, and/or the voice recognizer 330. In some examples, the documenter 210 receives control interface data from the control interface 206. The documenter 210 receives information at the documentation compiler 312. The documentation compiler 312 compiles the data to be documented by the example mobile device 200. In some examples, the documentation compiler 312 sorts the information based on the time the information was received at the documentation compiler 312. In some examples, the documentation compiler 312 converts voice and/or image data received from the voice recognizer 330, user command identifier 328, and/or device identifier 324 to text data. In some examples, the documentation compiler then compiles the text data based on a time associated with receiving the data from the user. In some examples, the documentation compiler 312 forwards the compiled data to the report generator 314 for generation of a report to a user.

The example report generator 314 of FIG. 3 generates reports for presentation to a user. In some examples, the user may customize the report via a control interface (e.g. the control interface 206), based on time, location, user, procedure, information, etc. In some examples, the report generator sorts data from the documentation compiler 312 based on data type (e.g., audio data, device data, command data (by hand and/or voice), etc.). In some examples the report generator may retrieve a video recorded by a camera (e.g. the camera 202) of a procedure, and associate the video with the generated report. In some examples, the generated report is displayed via a display (e.g. a touchscreen) of a mobile device (e.g. the mobile device 200). In some examples, the example report is stored in an example database of the example mobile device and/or a database connected to a network in connection with the mobile device.

While an example manner of implementing the example mobile device 200 of FIG. 2 and more specifically, the example controller 220 and example documenter 210 of FIG. 3, have been illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example device detector 322, the example device identifier 324, the example image filter 326, the example user command identifier 328, the example voice recognizer 330, the example documentation compiler 312, and the example report generator 314 and/or, more generally, the example controller 220 and the example documenter 210 of FIGS. 2 and/or 3 may be implemented by hardware, software, firmware and/or any combination of hardware, software and/or firmware. Thus, the example device detector 322, the example device identifier 324, the example image filter 326, the example user command identifier 328, the example voice recognizer 330, the example documentation compiler 312, and the example report generator 314 and/or, more generally, the example controller 220 and the example documenter 210 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of this patent are read to cover a purely software and/or firmware implementation, at least one of, the example device detector 322, the example device identifier 324, the example image filter 326, the example user command identifier 328, the example voice recognizer 330, the example documentation compiler 312, and the example report generator 314 are hereby expressly defined to include a computer readable storage medium such as a memory, DVD, CD, etc. storing the software and/or firmware. Further still, the example controller 220 and documenter 210 may include one or more elements, processes and/or devices in addition to, or instead of, those illustrated in FIGS. 2 and/or 3, and/or may include more than one of any or all of the illustrated elements, processes and devices.

Figure 4:
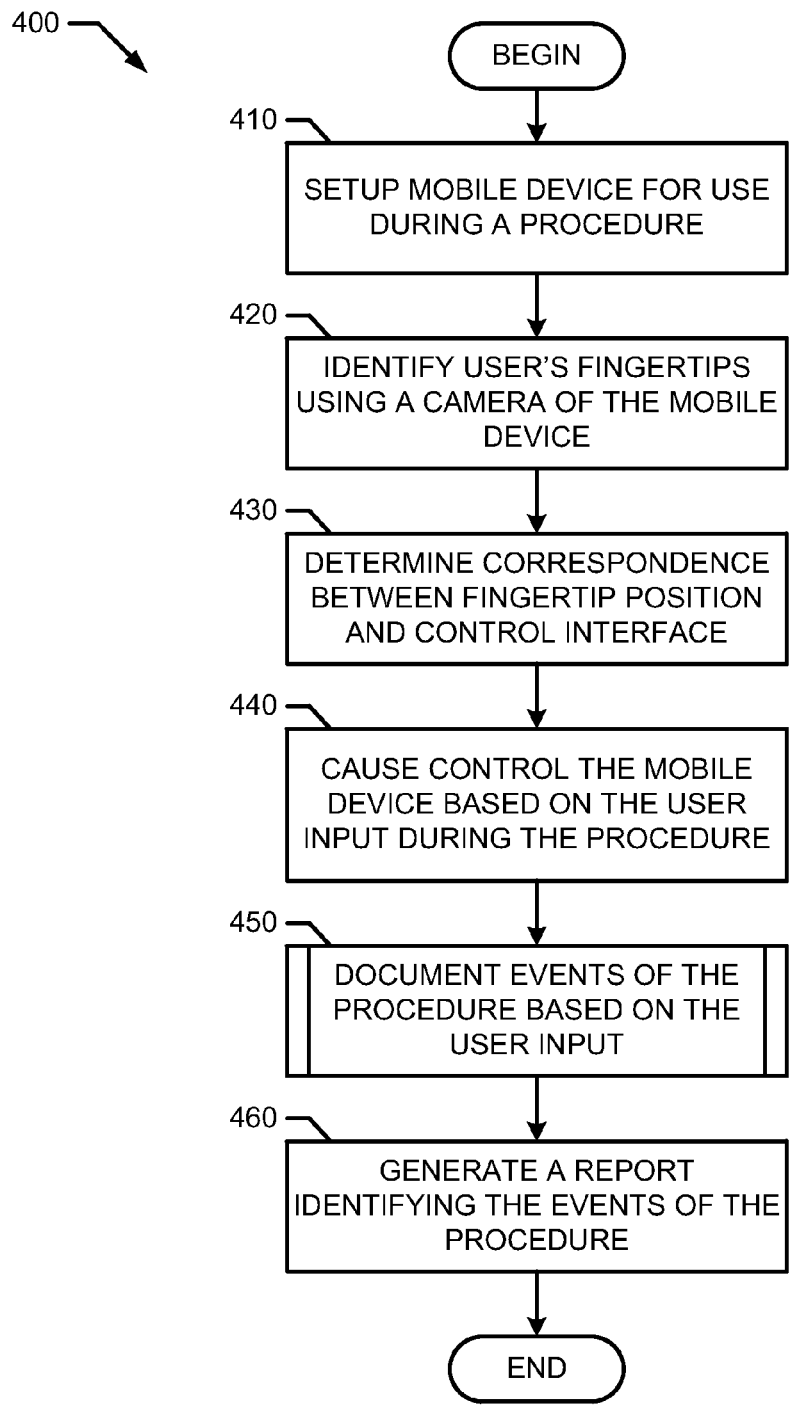
FIG. 4 is a flowchart representative of first example machine readable instructions that may be executed to implement the example controller and/or documenter of FIGS. 2 and/or 3.
Figure 5:
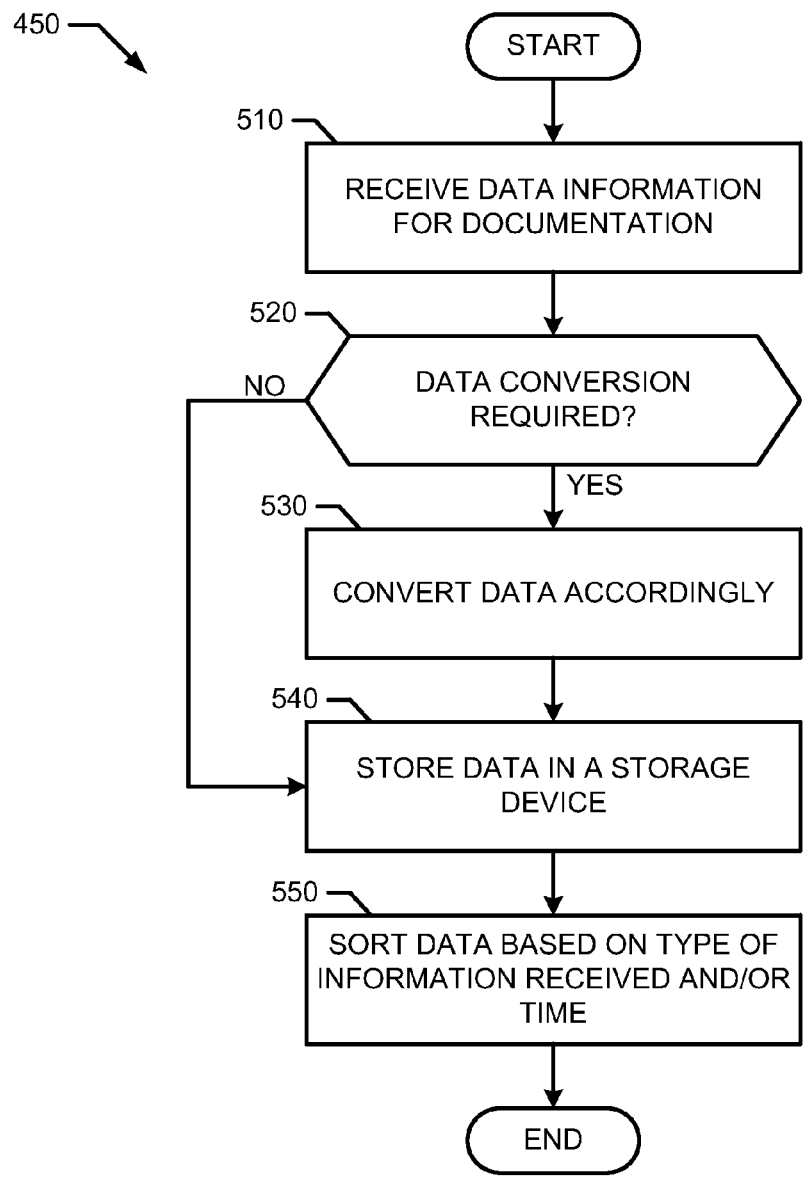
FIG. 5 is a flowchart representative of second example machine readable instructions that may be executed to implement the example documenter of FIGS. 2 and/or 3.
Figure 6:
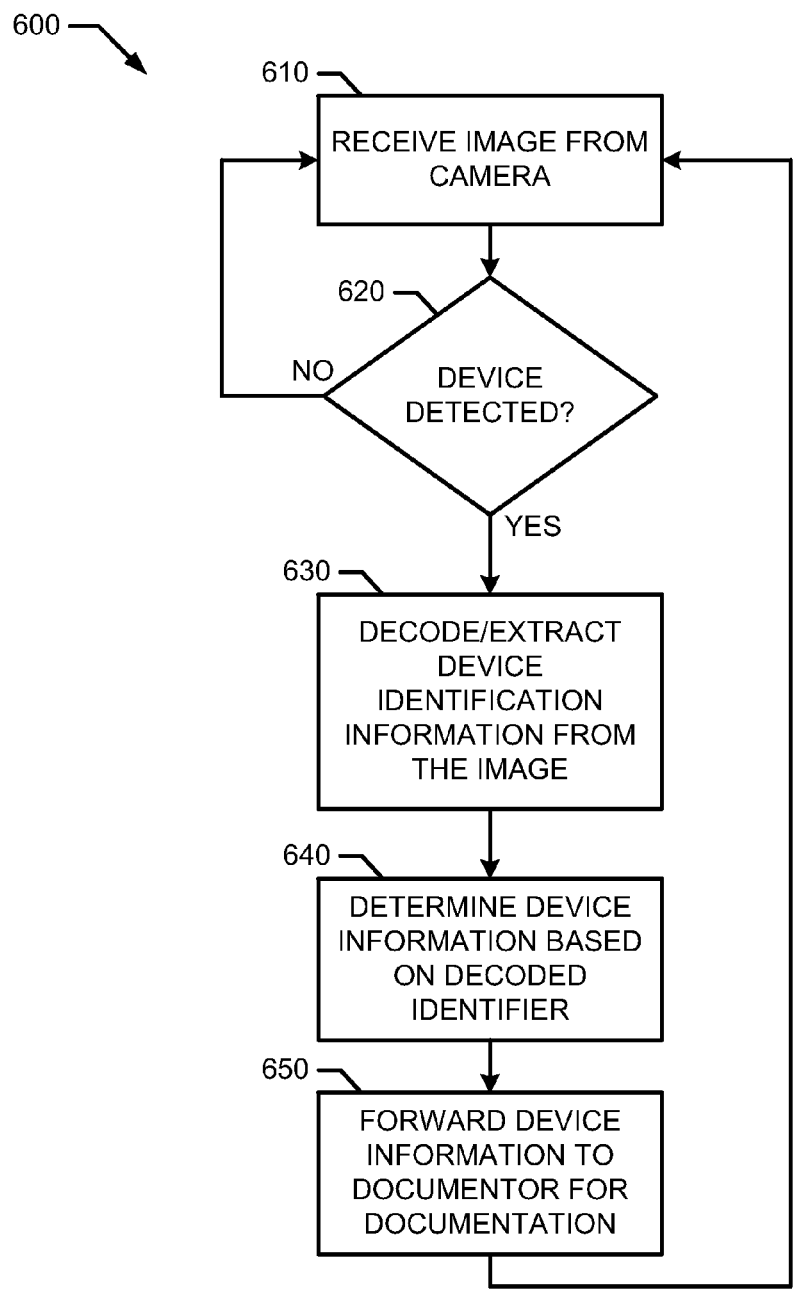
FIG. 6 is a flowchart representative of third example machine readable instructions that may be executed to implement an example device identifier of the example documenter of FIG. 3.

Flowcharts representative of example machine readable instructions for implementing the controller 220 and the documenter 230 of FIGS. 2 and/or 3 are shown in FIGS. 4-6. In this example, the machine readable instructions comprise program(s) for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a BLU-RAY™ disc, or a memory associated with the processor 812, but the entire program and/or parts thereof could alternatively be executed by a device other than the processor 812 and/or embodied in firmware or hardware. Further, although the example program is described with reference to the flowcharts illustrated in FIGS. 4-6, many other methods of implementing the example controller 220 and documenter 210 of FIGS. 2 and/or 3 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a BLU-RAY™ disc, a cache, a random-access memory (RAM)) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device or disc and to exclude propagating signals. Additionally or alternatively, the example processes of FIGS. 4-6 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage medium in which information is stored for any duration (e.g., for extended time periods, permanently, brief instances, for temporarily buffering, and/or for caching of the information). As used herein, the term non-transitory computer readable storage medium is expressly defined to include any type of computer readable storage device or disc and to exclude propagating signals.

Example machine readable instructions 400 that may be executed to implement the controller 220 and/or documenter 210 of FIGS. 2 and/or 3 are represented by the flowchart shown in FIG. 4. The machine readable instructions 400 of FIG. 4, upon execution, cause the controller 220 and documenter 210 of an example mobile device 200 to documents events of a procedure using based on one or more users interacting with the mobile device in a touchless environment, such as example environment 100 of FIG. 1. At block 410, an example mobile device, such as mobile device 200 of FIG. 2, is setup for use during a procedure in an example touchless environment, such as example environment 100. In some examples, the mobile device 100 is setup using a user interface prior to bringing the mobile device 200 into the touchless environment 100. In some examples, the setup of the mobile device 200 includes executing an example documentation application stored on the mobile device 200.

At block 420, position of a user's fingertip(s) is identified. For example, the camera 202 of the example mobile device 200 is used to identify a user's fingertips. The image filter 326 receives images from the camera 202. The image filter 326 applies an entropy-based segmentation to the images followed by, for example, min-max filter to identify one or more user's fingertips.

In some examples, an initial identification of a user's fingertips takes place following execution of an example documentation application of block 410. In some examples, a user establishes an example virtual plane corresponding to a control interface 206 (e.g. a display, touchscreen, etc.) of the mobile device 200. The virtual plane may be established by performing a calibration, wherein the user identifies an upper-left corner and a lower-right corner of the virtual plane and/or an upper-right corner and a lower-left corner of the virtual plane upon execution of an example documentation application, for example.

At block 430 of the illustrated example, a correspondence between the user's fingertip position within an established virtual plane is determined. For example, the user command identifier 328 of the example controller 220 may determine a correspondence between a user's fingertip position within an established virtual plane using the camera 202 of the mobile device 200. At block 430, a tracking is performed using a pixel shift algorithm for fast tracking of segmented zones of the images received from the image filter 326. In some examples, horizontal and vertical tracking (see, e.g., FIG. 7C) is used for navigation within an example application. In block 430, using a texture based entropy segmentation allows for an example user's hands, fingers, and/or fingertips and/or the gloves covering them to become soiled or covered in debris (e.g. blood, dirt, oils, etc.) during a procedure without affecting the image filter's 326 ability to identify the user's hands, fingers, and/or fingertips and their location. At block 430, the user command identifier 328 track's the user's fingertip position within the virtual plane and corresponds that position to a location on the control interface 206 of the mobile device 200.

At block 440 of FIG. 4, the user command identifier 328 determines that the user has input a command based on the user's fingertip position, and in some examples, based on the user's fingertip position in an example virtual plane. In some examples, an example tracking of the user's fingertips in images received from the image filter 326 identifies a user's action of touching an up control by estimation of the user's fingertip distance to the virtual plane and/or the control interface 206 of the mobile device 200. In some examples, the estimation is a match the matter—object forward and then object backward with a timing variable. Using match-the-matter estimation, the analyzed patters may be mapped to touch events for execution of an application. An icon for executing the application may be displayed on the control interface 206 at a location corresponding to the user's fingers location in the example virtual plane.

At block 450, an example documenter 210 of the mobile device 200 documents events of a procedure based upon a user's input and interaction with the mobile device 200. In some examples, a user may select which events of a procedure are to be documented by documenter 210. In some examples, the documenter automatically documents all commands and information received by any interactions of any users of the mobile device 200. Instructions of block 450 are further explained in FIG. 5.

At block 460 of FIG. 4, the example documenter 210 may generate a report via report generator 314. In some examples, the report generator sorts the data from the documentation compiler 312 based on data type (e.g. audio data, device data, command data, etc.). In some examples, the report generator retrieves a video of a procedure recorded by the camera 202 and associates the video with the generated report. In some examples, the generated report is displayed via a display (e.g. control interface 206) of the mobile device 200 and/or the example report may be stored in an example database of the example mobile device and/or a database connected to a network in connection with the mobile device.

FIG. 5 illustrates example machine readable instructions 450 that may be executed to implement block 450 of FIG. 4. The instructions 450 begin when the documenter 210 receives data information for documentation at block 510. At block 510, the documenter 210 may receive data information for documentation from the device identifier 324 (see FIG. 6), the user command identifier 328, the voice recognizer 330, and/or the control interface 206. Accordingly, the data received may be image data, voice data, metadata, text data, or any form of data.

At block 520, the document compiler 312 determines whether the data needs to be converted before compiling. The documenter 210 may determine whether to convert the received data (e.g. from voice to text and/or image to metadata) based on a user's input from the control interface 206 and/or settings set by the user. If the received data does not need to be converted, control moves to block 540, at which the data is stored in a storage device of the mobile device 200 by the documentation compiler 312. In some examples, a user may indicate that all documentation data be converted to text in the documentation compiler 312. If the received data does need to be converted, the documentation compiler 312 then converts the data based on setting(s) corresponding to the type of data received. Image data from the device identifier may be converted to text data identifying the device information, and/or voice data received from the voice recognizer may be transcribed to text data, for example. At block 540, all received documentation data should be converted to the correct format prior to being stored in an example storage device of the mobile device 200 or an example storage device connected to a network in communication with the mobile device 200.

In some examples, the documentation compiler 312 of documenter 210 sorts the documentation data based on at least one of data type or time. In some examples, the sorted data may be associated with a video recording corresponding to the documentation data. In some examples, the documentation data is received by the mobile device 200 while a camera 202 of the mobile device 200 was recording the video.

FIG. 6 illustrates example machine readable instructions 600 that may be executed to implement the device detector 322 and device identifier of FIG. 3. At block 610 of the illustrated example, the device detector 322 receives images from the example camera 202. At block 620, the device detector 322 determines whether a device (e.g., implant, tool, etc.) is located within the image received. The device detector 322 may detect a device based on a label, bar code, shape or any other distinguishing features of a device identified in the images. If the device detector 322 does not detect a device in the image, control returns to block 610 to receive the next image from the camera 202.

If the device detector 322 does detect a device at block 620, the device identifier 324 at block 630 may decode and/or extract device identification information (e.g., a bar code, label, etc.) from the image containing the identified device. At block 640, the device identifier 324 may then determine device information (e.g., the device name, model number, etc.) based on the identification information. In some examples, the device identifier 324 cross checks the identification information with stored information on a storage drive of the mobile device to determine the identification information. In some examples, the device identifier 324 references a database of a storage device connected to a network (e.g., a local area network or the Internet) to determine the device information. At block 650, the device identifier 324 then forwards the device information to the documenter 210 for documentation of the identified device. In some examples, the device identifier 324 forwards an image of the device along with the device information for documentation.

Figure 7A:
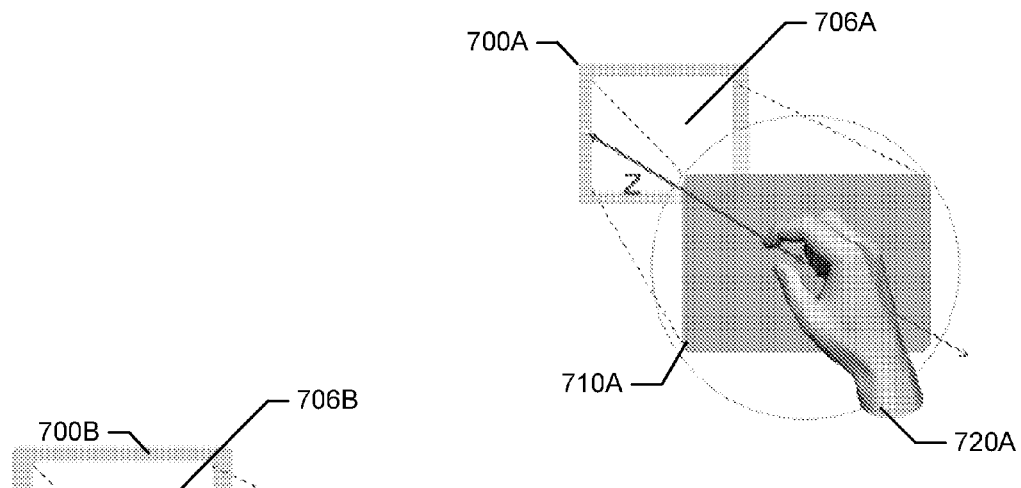
FIGS. 7A-7C illustrate example finger positions and/or gestures for control of the example mobile device of FIGS. 1 and/or 2.
Figure 7B:
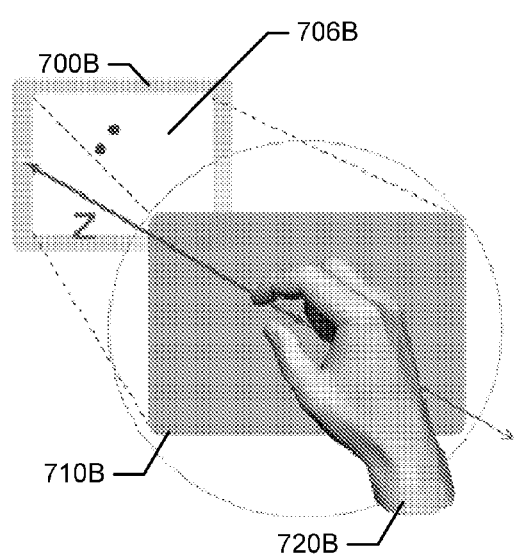
Figure 7C:
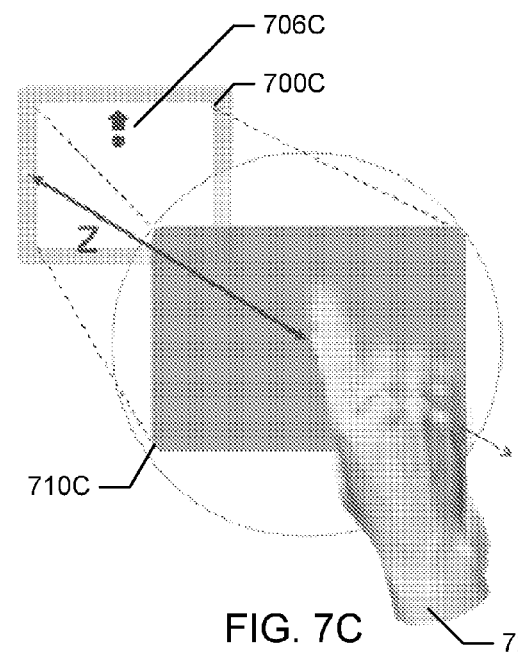

FIGS. 7A-7C are illustrated examples of fingertip movements and/or positions that may be used to control the mobile device 200. FIGS. 7A-7C each show an example mobile device 700A, 700B, 700C (which may be implemented by the mobile device 200 of FIG. 2), an example virtual plane 710A, 710B, 710C, and an example user hand position 720A, 720B, 720C, respectively. In FIGS. 7A-7C the example virtual planes 710A, 710B, 710C are a distance Z from the example mobile devices 700A, 700B, 700C. In FIGS. 7A-7C, corresponding dotted lines identify that the corners of the virtual planes 710A, 710B, 710C correspond to the corresponding corners of a control interface 706A, 706B, 706C of the mobile device 700A, 700B, 700C, respectively.

FIG. 7A illustrates a virtual plane 710A having been established a distance Z from the mobile device 700A. When the user hand 720A interacts with the virtual plane 710A, an example camera (e.g. the camera 202) of the mobile device 700A forwards images to an image filter 326 to determine the hand, finger, and/or fingertip position relative to the virtual plane 710A. From there, an example user command identifier can interpret commands based on the positions of the user's hand 720A.

FIG. 7B illustrates an example command made by a user to zoom in a display of the control interface 706B. In FIG. 7B, the user hand 720B may "pinch" the virtual screen to zoom in and/or the control interface 706B of the mobile device 700B. FIG. 7C illustrates an example command made by a user to scroll up and/or down a page being displayed on the control interface 706C of the user device 700C. FIGS. 7A-7C are strictly considered to be example hand gestures or positions to control the mobile devices 700A, 700B, 700C and may be modified to implemented other functions or controls of the mobile devices 700A, 700B, 700C.

Figure 8:
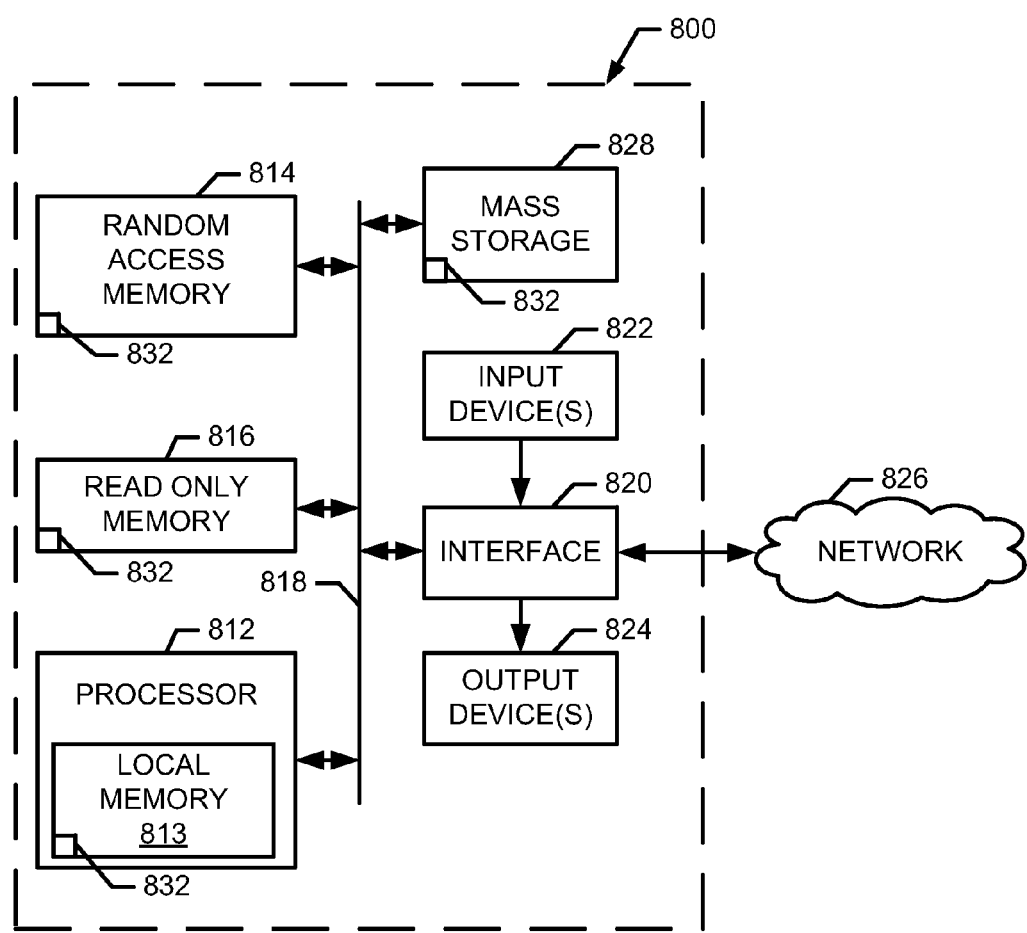
FIG. 8 is a block diagram of an example processor platform that may execute the instructions of FIGS. 4, 5, and/or 6 to implement the example controller of FIGS. 2 and/or 3.

FIG. 8 is a block diagram of an example computer 800 capable of executing the instructions of FIGS. 4-6 to implement the controller 220 and documenter 210 of FIGS. 2 and/or 3. The computer 800 can be, for example, a server, a personal computer, a mobile phone (e.g., a cell phone), a smartphone, a table personal computer, a personal digital assistant (PDA), a digital video recorder, a personal video recorder, a set top box, or any other type of computing device.

The system 800 of the instant example includes a processor 812. For example, the processor 812 can be implemented by one or more Intel® microprocessors from the Pentium® family, the Itanium® family or the XScale® family. Of course, other processors from other families are also appropriate.

The processor 812 is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is typically controlled by a memory controller (not shown).

The computer 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display). The interface circuit 820, thus, typically includes a graphics driver card.

The interface circuit 820 also includes a communication device, such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives.

The coded instructions of FIGS. 4-6 may be stored in the mass storage device 828, in the volatile memory 814, in the non-volatile memory 816, and/or on a removable storage medium such as a CD or DVD From the foregoing, it will appreciate that the above disclosed methods, apparatus and articles of manufacture allow for touchless control of a mobile device in a touchless environment and documentation of a procedure by that mobile device based on input control using a camera of the mobile device, audio recording, and/or video recording, as well as device implant and/or tool recognition abilities.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A documenting procedure method comprising:
identifying a position of one or more of a user's fingertips in a virtual plane formed apart from a control interface of a mobile device using a camera of the mobile device and an entropy-based segmentation of an image input from the camera;
determining a correspondence between user fingertip position and the control interface of the mobile device, the correspondence forming a user input, the control interface including a plurality of functions to be executed based on the user input;
facilitating execution, via the mobile device, of one or more of the plurality of functions based on the user fingertip position in the virtual plane during a procedure; and
documenting one or more events of the procedure based on the user input to generate a report to be output via the mobile device.

2. A method according to claim 1, wherein the virtual plane is separate from and corresponds to the control interface of the mobile device, and
wherein first coordinates of the virtual plane correspond to second coordinates of the control interface of the mobile device.

3. A method according to claim 1, further comprising detecting a device identification in the image input using the camera of the mobile device;
determining device information based on the device identification; and
documenting the device information in the report as one of the one or more events of the procedure.

4. A method according to claim 1, further comprising storing at least one of an audio recording or video recording of the procedure using at least one of a microphone or the camera based on a user command identified by the user fingertip position; and
associating the recording of the procedure with the report.

5. A method according to claim 1, wherein the user's fingertip position is to be identified at a first time when one or more gloves covering the user's fingertips are substantially clear of debris and at a second time when the one or more gloves covering the user's fingertips are substantially covered in debris.

6. A method according to claim 1, wherein documenting the one or more events further comprises converting documentation data from the execution of the one or more functions to a format based on at least one of a user setting or data type.

7. A method according to claim 1, wherein the mobile device is at least one of a tablet computer, smartphone, personal digital assistant, personal computer, or laptop computer.

8. An apparatus for documenting procedure comprising:
an image filter to identify a position of one or more of fingertips in a virtual plane formed apart from a control interface of a mobile device using a camera of the mobile device and an entropy-based segmentation of an image input from the camera;
a user command identifier to determine a correspondence between user fingertip position and the control interface of the mobile device, the correspondence forming a user input, the control interface including a plurality of functions to be executed based on the user input;
a controller to facilitate execution, via the mobile device, of one or more of the plurality of functions based on the user fingertip position in the virtual plane during a procedure; and
a documenter to document one or more events of the procedure based on the user input to generate a report to be output via the mobile device.

9. An apparatus according to claim 8, wherein the virtual plane is separate from and corresponds to the control interface of the mobile device, and
wherein first coordinates of the virtual plane correspond to second coordinates of the control interface of the mobile device.

10. An apparatus according to claim 8, further comprising a device identification detector to detect a device identification in the image input using the camera of the mobile device; and
a device identifier to determine device information based on the device identification,
wherein the documenter documents the device information in the report as one of the one or more events of the procedure.

11. An apparatus according to claim 8, wherein the controller stores at least one of an audio recording or video recording of the procedure using at least one of a microphone or the camera based on a user command identified by the user fingertip position and the documenter associates the recording of the procedure with the report.

12. An apparatus according to claim 8, wherein the user's fingertip position is identified at a first time when one or more gloves covering the user's fingertips are substantially clear of debris and at a second time when the one or more gloves covering the user's fingertips are substantially covered in debris.

13. An apparatus according to claim 8, wherein documenting the one or more events further comprises converting documentation data from the execution of the one or more functions to a format based on at least one of a user setting or data type.

14. An apparatus according to claim 8, wherein the mobile device is at least one of a tablet computer, smartphone, personal digital assistant, personal computer, or laptop computer.

15. A non-transitory machine readable storage medium comprises instructions which, when executed, cause a machine to at least:
identify a position of one or more of a user's fingertips in a virtual plane formed apart from a control interface of a mobile device using a camera of the mobile device and an entropy-based segmentation of an image input from the camera;
determine a correspondence between user fingertip position and the control interface of the mobile device, the correspondence forming a user input, the control interface including a plurality of functions to be executed based on the user input;
facilitate execution, via the mobile device, of one or more of the plurality of functions based on the user fingertip position in the virtual plane during a procedure; and
document one or more events of the procedure based on the user input to generate a report to be output via the mobile device.

16. A non-transitory machine readable storage medium according to claim 15, wherein the virtual plane is separate from and corresponds to the control interface of the mobile device, and
wherein first coordinates of the virtual plane correspond to second coordinates of the control interface of the mobile device.

17. A non-transitory machine readable storage medium according to claim 15, wherein the instructions cause the machine to detect a device identification in the image input using the camera of the mobile device;
determine device information based on the device identification; and
document the device information in the report as one of the one or more events of the procedure.

18. A non-transitory machine readable storage medium according to claim 15, wherein the instructions cause the machine to store at least one of an audio recording or video recording of the procedure using at least one of a microphone or the camera based on a user command identified by the user fingertip position; and
associate the recording of the procedure with the report.

19. A non-transitory machine readable storage medium according to claim 15, wherein the user's fingertip position is identified at a first time when one or more gloves covering the user's fingertips are substantially clear of debris and at a second time when the one or more gloves covering the user's fingertips are substantially covered in debris.

20. A non-transitory machine readable storage medium according to claim 15, wherein documenting the one or more events further comprises converting documentation data from the execution of the one or more functions to a format based on at least one of a user setting or data type.

* * * * *